United States Patent
Cunningham et al.

(10) Patent No.: US 12,151,530 B1
(45) Date of Patent: Nov. 26, 2024

(54) TRAILER SUSPENSION CONTROL SYSTEMS AND METHODS

(71) Applicant: GM GLOBAL TECHNOLOGY OPERATIONS LLC, Detroit, MI (US)

(72) Inventors: Andrew Thomas Cunningham, Royal Oak, MI (US); Adam Golembeski, Charlotte, NC (US); Derek Rouse, Sarnia (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/338,565

(22) Filed: Jun. 21, 2023

(51) Int. Cl.
*B60G 17/016* (2006.01)
*B60G 17/019* (2006.01)

(52) U.S. Cl.
CPC .... *B60G 17/0162* (2013.01); *B60G 17/01908* (2013.01); *B60G 2300/04* (2013.01); *B60G 2400/0513* (2013.01); *B60G 2400/252* (2013.01); *B60G 2400/412* (2013.01); *B60G 2400/61* (2013.01); *B60G 2400/824* (2013.01); *B60G 2401/14* (2013.01); *B60G 2500/326* (2013.01); *B60G 2800/0194* (2013.01); *B60G 2800/9122* (2013.01); *B60G 2800/914* (2013.01)

(58) Field of Classification Search
CPC .......... B60G 2300/04; B60G 2300/042; B60G 17/0162; B60G 17/01908; B60G 2400/0513; B60G 2400/252; B60G 2400/412; B60G 2400/61; B60G 2400/824; B60G 2401/14; B60G 2500/326; B60G 2800/0194; B60G 2800/9122; B60G 2800/914
See application file for complete search history.

(56) References Cited

U.S. PATENT DOCUMENTS

| | | | | |
|---|---|---|---|---|
| 2,967,062 A | * | 1/1961 | Leslie | B60G 17/0155 280/5.506 |
| 3,893,680 A | * | 7/1975 | Marcillat | B60G 17/01908 280/6.16 |
| 5,375,880 A | * | 12/1994 | Fleener | B60G 17/0155 280/5.514 |
| 5,383,680 A | * | 1/1995 | Bock | B60G 17/0185 280/5.502 |
| 6,209,887 B1 | * | 4/2001 | Kyrtsos | B60G 17/02 280/124.157 |
| 6,240,339 B1 | * | 5/2001 | von Mayenburg | B60G 17/0523 701/72 |

(Continued)

FOREIGN PATENT DOCUMENTS

| | | | | |
|---|---|---|---|---|
| DE | 4441307 A1 | * | 6/1995 | ......... B60G 17/0155 |
| DE | 102015224996 A1 | * | 4/2017 | ............. B60G 11/27 |

(Continued)

OTHER PUBLICATIONS

German Office Action from counterpart DE1020231296396, dated Aug. 8, 2024.

*Primary Examiner* — Laura Freedman

(57) ABSTRACT

A trailer includes: one or more adjustable suspension actuators; an actuator control module configured to actuate the one or more adjustable suspension actuators; and an adjustment module configured to selectively adjust the one or more adjustable suspension actuators while the trailer is moving based on one or more operating parameters of the trailer.

17 Claims, 6 Drawing Sheets

(56) References Cited

U.S. PATENT DOCUMENTS

| | | | | |
|---|---|---|---|---|
| 6,384,719 | B1* | 5/2002 | Dieckmann | B60T 8/243 |
| | | | | 701/72 |
| 6,553,284 | B2* | 4/2003 | Holst | B60T 8/243 |
| | | | | 701/1 |
| 7,490,913 | B2* | 2/2009 | Csak | B60G 17/0195 |
| | | | | 303/3 |
| 7,631,881 | B2* | 12/2009 | Broemeling | B60G 9/02 |
| | | | | 280/5.521 |
| 7,841,608 | B2* | 11/2010 | Morris | B60G 17/0523 |
| | | | | 280/124.16 |
| 7,877,884 | B2* | 2/2011 | Harrill | B60G 9/003 |
| | | | | 33/203.18 |
| 8,185,269 | B2* | 5/2012 | Li | B60G 17/0165 |
| | | | | 280/5.514 |
| 8,655,577 | B2* | 2/2014 | Stender | B60G 17/01908 |
| | | | | 701/40 |
| 8,720,938 | B2* | 5/2014 | Ehrlich | B60G 17/0528 |
| | | | | 280/789 |
| 8,925,946 | B2* | 1/2015 | Albert | B60G 17/018 |
| | | | | 280/124.157 |
| 9,022,404 | B2* | 5/2015 | Risse | B60G 17/018 |
| | | | | 280/124.157 |
| 9,174,508 | B2* | 11/2015 | Anderson | B60G 17/016 |
| 9,227,476 | B2* | 1/2016 | Grimm | B60G 17/052 |
| 9,283,825 | B2* | 3/2016 | Mousa | B60G 17/01908 |
| 9,517,674 | B2* | 12/2016 | Chua | B60G 17/0525 |
| 9,834,055 | B2* | 12/2017 | Joachim | B60G 11/27 |
| 9,902,401 | B2* | 2/2018 | Stein | G06T 3/40 |
| 10,093,145 | B1* | 10/2018 | Vaughan | B60G 17/0155 |
| 10,137,750 | B2* | 11/2018 | Macnamara | B60G 17/0526 |
| 10,836,232 | B2* | 11/2020 | Plath | B60G 17/019 |
| 11,179,991 | B1* | 11/2021 | Carter | B60G 11/30 |
| 11,345,209 | B1* | 5/2022 | Carter | B60G 21/055 |
| 11,458,794 | B2* | 10/2022 | Coombs | B60G 17/0416 |
| 2010/0117318 | A1* | 5/2010 | Grozev | B60G 17/0523 |
| | | | | 280/124.16 |
| 2010/0117320 | A1* | 5/2010 | Grozev | B60G 11/58 |
| | | | | 280/124.16 |
| 2014/0081522 | A1* | 3/2014 | Fry | B60G 17/017 |
| | | | | 701/37 |
| 2014/0288776 | A1* | 9/2014 | Anderson | F16F 9/064 |
| | | | | 701/37 |
| 2019/0118607 | A1* | 4/2019 | Schutt | B60G 5/04 |
| 2019/0168565 | A1* | 6/2019 | Dolan | B60G 17/0525 |
| 2022/0414927 | A1* | 12/2022 | Ricke | G06T 7/579 |
| 2023/0249673 | A1* | 8/2023 | Diessner | B60W 10/22 |
| | | | | 701/38 |

FOREIGN PATENT DOCUMENTS

| | | | | |
|---|---|---|---|---|
| DE | 102019120535 | A1* | 2/2021 | B60G 17/005 |
| DE | 102021113941 | A1 | 5/2022 | |
| JP | 57087708 | A* | 6/1982 | |
| WO | WO-2015154921 | A1* | 10/2015 | B60G 17/015 |

* cited by examiner

TRAILER SUSPENSION CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to trailers for vehicles and more particularly to systems and methods for controlling suspension actuators of trailers.

Vehicles include one or more torque producing devices, such as an internal combustion engine and/or an electric motor. The torque producing device(s) are used to output torque for propulsion of the vehicle.

Passengers of a vehicle ride within a passenger cabin (or passenger compartment) of the vehicle. A driver actuates an accelerator pedal to input a request for acceleration of the vehicle. The driver actuates a brake pedal of the vehicle to input a request for deceleration of the vehicle. The driver turns a steering wheel to turn or steer or to input a request to turn or steer the vehicle left or right.

A brake system of the vehicle applies friction brakes to rotors, respectively, to slow wheels of the vehicle in response to actuation of the brake pedal.

SUMMARY

In a feature, a trailer includes: one or more adjustable suspension actuators; an actuator control module configured to actuate the one or more adjustable suspension actuators; and an adjustment module configured to selectively adjust the one or more adjustable suspension actuators while the trailer is moving based on one or more operating parameters of the trailer.

In further features, the trailer includes a camera configured to capture images of a road in front of the trailer, where the one or more operating parameters include a curvature of the road in front of the trailer determined based on an image from the camera.

In further features, the adjustment module is configured to adjust the one or more adjustable suspension actuators and lower a right side of the trailer when the road in front of the trailer curves rightward.

In further features, the adjustment module is configured to adjust the one or more adjustable suspension actuators and raise a left side of the trailer when the road in front of the trailer curves rightward.

In further features, the adjustment module is configured to adjust the one or more adjustable suspension actuators and lower a left side of the trailer when the road in front of the trailer curves leftward.

In further features, the adjustment module is configured to increasingly lower the right side of the trailer as a radius of the curvature of the road in front of the trailer rightward decreases and vice versa.

In further features, the adjustment module is configured to actuate the one or more adjustable suspension actuators and lower both left and right sides of the trailer when the road in front of the trailer has approximately zero curvature.

In further features, the one or more operating parameters include a steering wheel angle (SWA) of a vehicle towing the trailer.

In further features, the adjustment module is configured to adjust the one or more adjustable suspension actuators and lower a right side of the trailer when SWA is to a right of a forward direction of travel of the vehicle.

In further features, the adjustment module is configured to increasingly lower the right side of the trailer as SWA moves rightward and away from the forward direction of travel of the vehicle.

In further features, the trailer includes a camera configured to capture images of a road in front of the trailer, where the one or more operating parameters include an overhead obstacle in front of the trailer detected in an image from the camera.

In further features, the adjustment module is configured to lower both left and right sides of the trailer when the overhead obstacle is present in front of the trailer.

In further features, the one or more operating parameters include trailer loads on left and right sides of the trailer measured using trailer load sensors.

In further features, the one or more operating parameters include right heights of left and right sides of the trailer measured using trailer load sensors of the trailer.

In further features, the one or more operating parameters include a yaw of the trailer measured using a yaw sensor of the trailer.

In further features, the one or more operating parameters include a lateral acceleration of the trailer.

In further features, the adjustment module is configured to adjust the one or more adjustable suspension actuators and lower a right side of the trailer when the lateral acceleration of the trailer is leftward.

In further features, the adjustment module is configured to adjust the one or more adjustable suspension actuators and raise a left side of the trailer when the lateral acceleration of the trailer is leftward.

In further features, the one or more adjustable suspension actuators include at least one of (a) a leaf spring and an actuator, (b) air bag suspension actuators, (c) hydraulic suspension actuators, and (c) magnetorheological suspension actuators.

In a feature, a method for a trailer includes: selectively actuating one or more adjustable suspension actuators of a trailer; and selectively adjusting the one or more adjustable suspension actuators while the trailer is moving based on one or more operating parameters of the trailer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
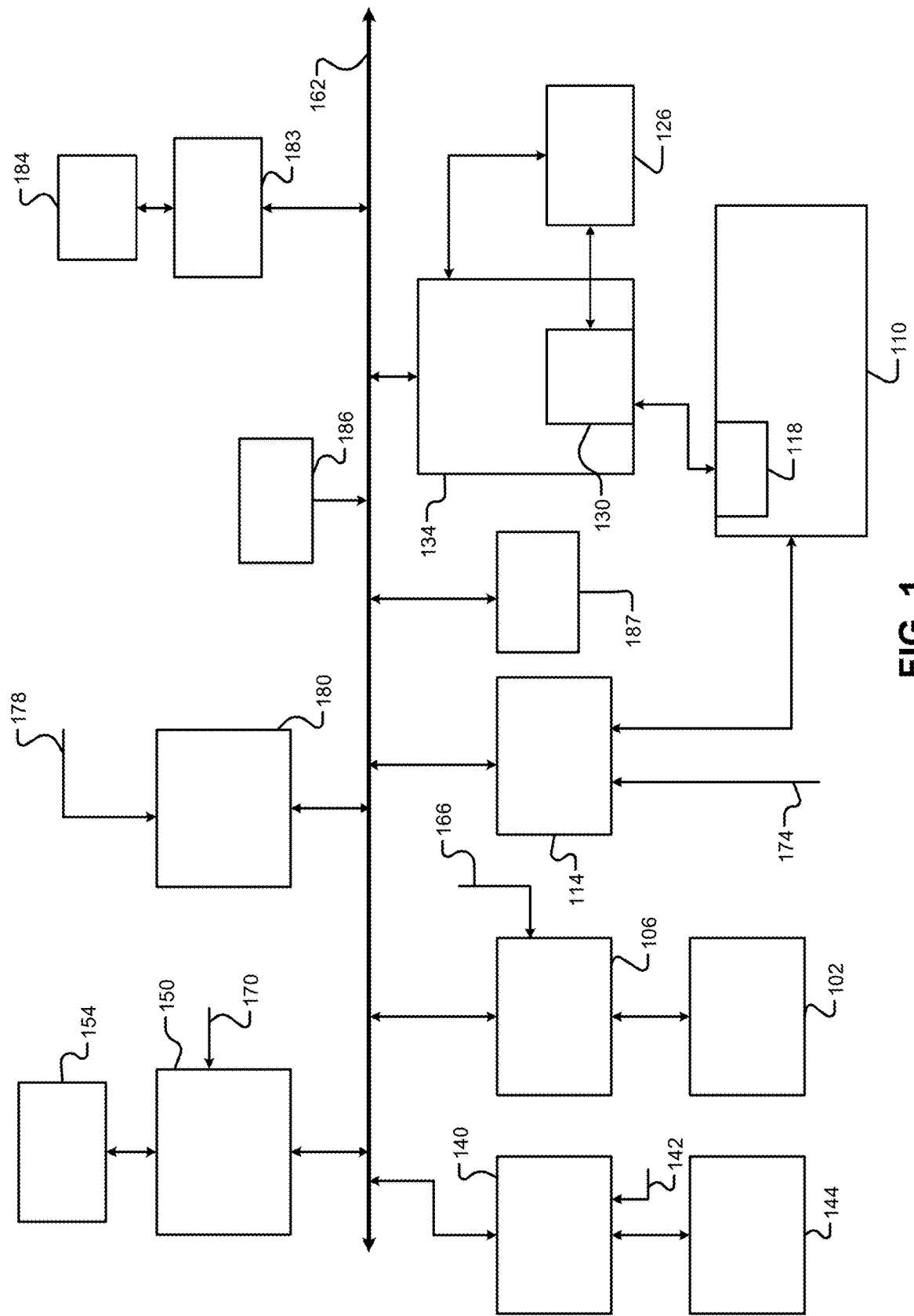
FIG. 1 is a functional block diagram of an example vehicle system.

In the drawings, reference numbers may be reused to identify similar and/or identical elements.

Various types of vehicles are available, including trucks, cars, utility vehicles, etc. Vehicles may be used for a variety of different purposes. For example, some vehicles may be used to tow trailers.

Trailers may include one or more adjustable suspension actuators configured to adjust one or more parameters of the suspension. Examples of adjustable suspension actuators include leaf springs with an actuator, airbag springs, hydraulic suspension actuators, magnetorheological suspension actuators, and other types of adjustable suspension actuators.

When a road turns, a trailer being towed by a vehicle may experience acceleration outwardly relative to the turn. The present application involves a control module of a trailer adjusting one or more of the adjustable suspension actuators based on input from one or more cameras and/or sensors of the vehicle for leveling of the trailer, for anti-roll control, to compensate for wind, for trailer lowering (e.g., to reduce drag), etc.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may control actuation of brake actuators 154 (brake actuator modules) of the vehicle based on one or more driver inputs, such as a brake pedal position (BPP) 170. The brake actuators 154 control application of friction brakes at the wheels, respectively, of the vehicle. The brake actuators 154 apply respective friction brakes independently of each other.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

The vehicle may include one or more additional control modules that are not shown, such as a chassis control module, a battery pack control module, etc. The vehicle may omit one or more of the control modules shown and discussed.

Figure 2:
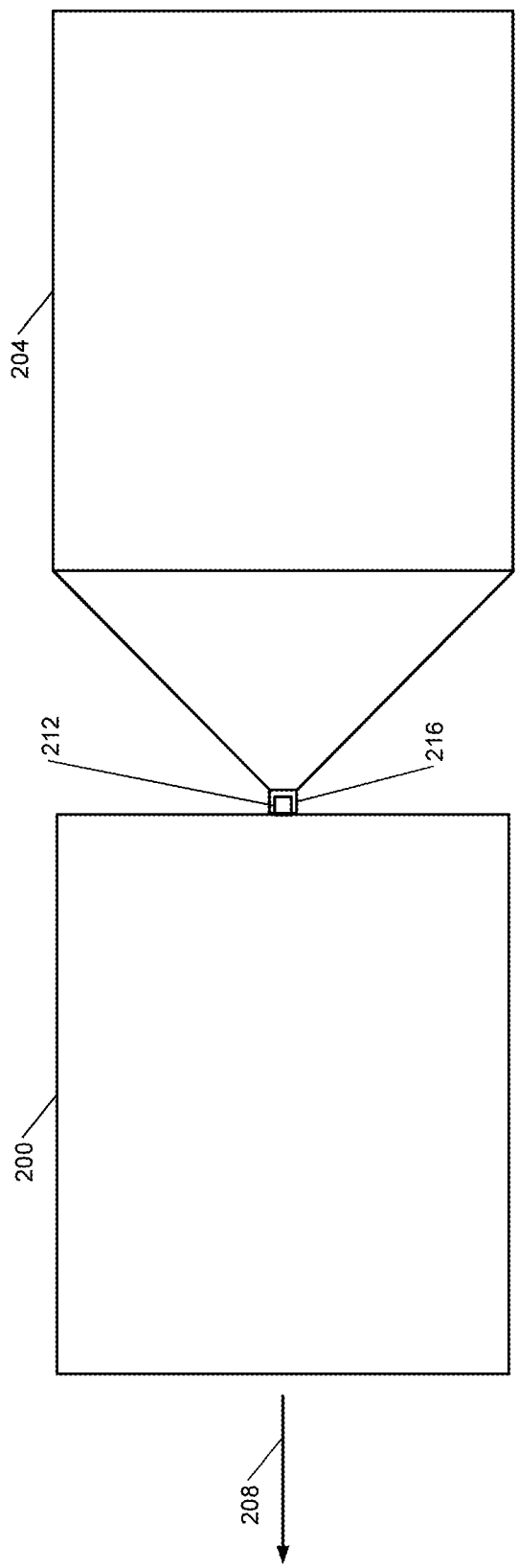
FIG. 2 is a top view of an example vehicle and a trailer.

FIG. 2 is a top view of an example vehicle 200 (e.g., of FIG. 1) and a trailer 204. A forward direction of the vehicle 200 is illustrated by arrow 208.

A ball 212 is connected to a trailer hitch that is mounted to the vehicle 200. The trailer 204 includes a tongue 216 that can be coupled to the ball 212 so the trailer 204 can be towed by the vehicle 200.

Figure 3:
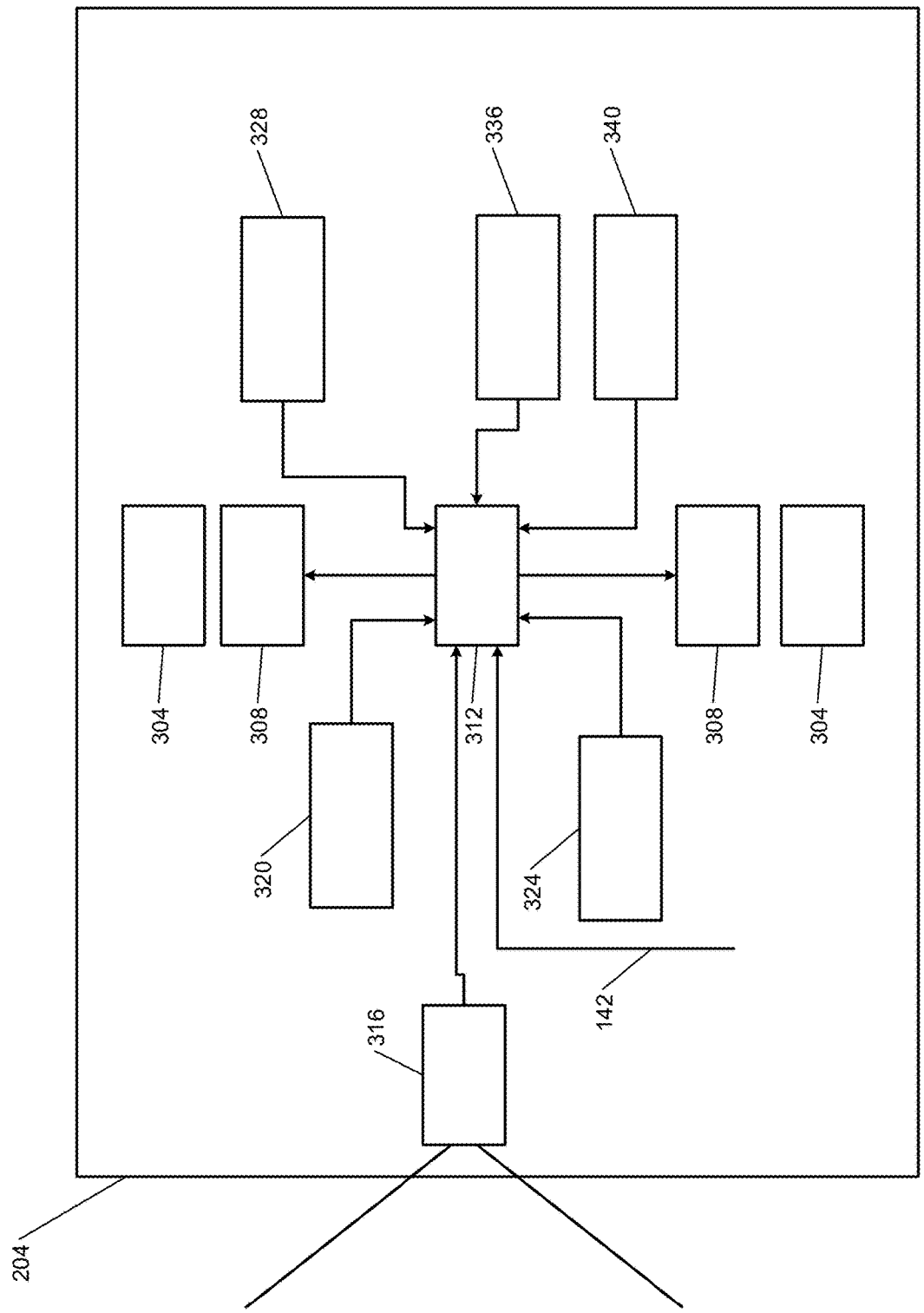
FIG. 3 is a functional block diagram of an example implementation of the trailer.

FIG. 3 is a functional block diagram of an example implementation of the trailer 204. The trailer 204 includes two or more wheels, such as 304. While the example of two wheels is shown, the present application is also applicable to trailers with more than two wheels. The trailer 204 may be a personal trailer, a commercial trailer, or another type of trailer. In various implementations, the trailer 204 may be an autonomously driven trailer that is not towed by a vehicle. The trailer 204 may be a semi trailer, a camper, or another suitable type of trailer.

The trailer 204 includes one or more adjustable suspension actuators, such as 308. Examples of adjustable suspension actuators include but are not limited to leaf springs with an actuator, airbag suspension actuators, hydraulic suspension actuators, magnetorheological suspension actuators, and other types of adjustable suspension actuators. A suspension control module 312 selectively actuates the suspension actuator(s) 308 based on one or more images from a forward facing camera 316 (e.g., road curvature) and/or input from one or more sensors. Examples of the sensors upon which the suspension control module 312 may selectively actuate the suspension actuator(s) 308 include a wind gauge 320, an inertial measurement unit (IMU) 324, a yaw sensor 328, one or more load sensors 336, one or more ride height sensors 340, and the SWA 142.

The camera 316 faces the forward direction 208 and captures images, such as including a road in front of the vehicle 200. The camera 316 may be disposed, for example, at a vertically upper portion of the trailer 204. The wind gauge 320 measures wind speed and direction on the trailer 204. The IMU 324 measures acceleration of the trailer 204 in one or more directions (e.g., longitudinal, lateral, vertical). The IMU 324 may include, for example, a 6-axis accelerometer or another suitable IMU. The yaw sensor 328 measures a yaw of the trailer 204. The load sensors 336 measure load on the wheels 304 of the vehicle, respectively. The load sensors 336 may be used, for example, to measure loads on the left and right lateral sides of the trailer 204. The ride height sensors 340 measure ride height of the trailer 204, for example, on the left and right lateral sides of the trailer 204. The ride height sensors 340 may include, for example, potentiometers, lasers, ultrasonic transceivers, or another suitable type of device configured to measure ride height.

Figure 4:
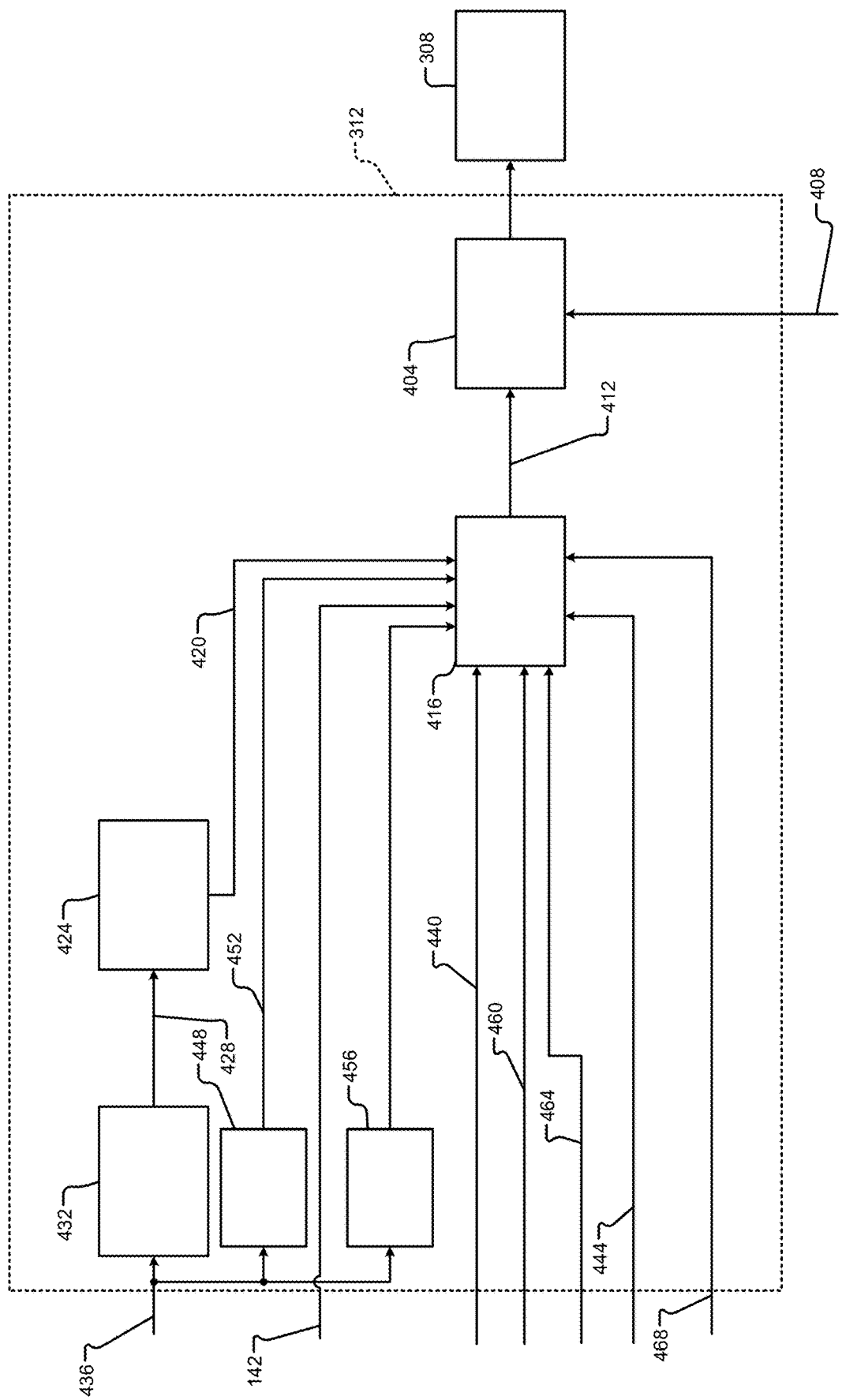
FIG. 4 is a functional block diagram of an example implementation of a suspension control module.

FIG. 4 is a functional block diagram of an example implementation of the suspension control module 312 of the trailer 204. An actuator control module 404 receives power 408 and controls actuation of the suspension actuators 308. For example, the actuator control module 404 may apply power to electric motors of the suspension actuators 308 or apply power to one or more other devices (e.g., pumps, valves, inductors, etc.) to actuate the suspension actuators 308. The actuator control module 404 may receive the power 408, for example, from the vehicle 200 (e.g., the battery 126, a battery of the trailer 204, or another suitable power source. In various implementations, the actuator control module 404 may perform alternating current (AC) to direct current (DC) conversion, DC to AC conversion, voltage boosting (increasing), and/or voltage bucking (decreasing).

The actuator control module 404 may generally actuate the suspension actuators 308 based on maintaining default (predetermined) parameters of the trailer 204, such as a predetermined ride height. The actuator control module 404 adjusts the suspension actuator(s) 308, however, under various circumstances based on an adjustment 412 from an adjustment module 416.

For example, the adjustment module 416 may adjust the suspension actuator(s) 308 based on a curvature 420 and direction of curvature of a road of the vehicle 200. A curvature module 424 may determine the curvature (e.g., radius) and direction of curvature based on lane boundaries 428 of the road identified by a lane module 432 in an image 436 from the camera 316. For example, when the road in front of the vehicle curves to the right, the trailer 204 will naturally experience leftward centripetal acceleration. The adjustment module 416 may therefore adjust the suspension actuator(s) 308 and lower the right side of the trailer 204 and/or raise the left side of the trailer 204. The adjustment module 416 may increase the lowering of the right side of the trailer 204 and/or the raising of the left side of the trailer 204 as the curvature of the road to the right increases, and vice versa. The adjustment module 416 may determine the adjustment(s), for example, using one of a lookup table and an equation that relates curvatures to adjustment(s).

The adjustment module 416 may oppositely adjust the suspension actuator(s) 308 for leftward curvature in the road. The adjustment module 416 may increase the lowering of the left side of the trailer 204 and/or the raising of the right side of the trailer 204 as the curvature of the road to the left increases, and vice versa. The adjustment to the suspension actuator(s) may level the floor of the trailer 204 or to lean the trailer 204 into the turn to provide anti-roll control.

Figure 5:
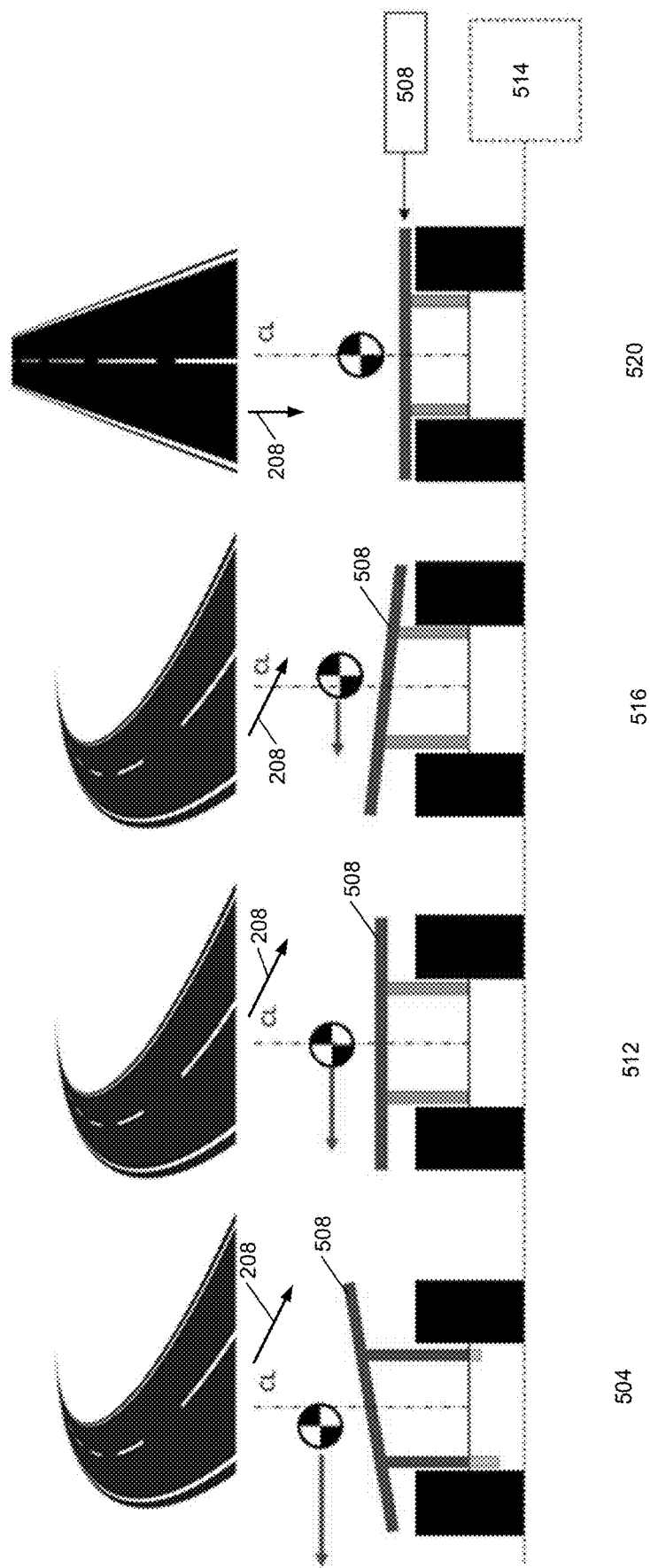
FIG. 5 is an example illustration of road curvature and trailer actuation.

FIG. 5 is an example illustration of road curvature and trailer actuation. The forward direction of travel 208 is illustrated. The road illustrates curvature already traversed by the vehicle, but as discussed above, the camera 316 captures images in front of the vehicle 200. The adjustment of the suspension actuator(s) 308 may therefore occur before curvature is reached. As discussed further below, the present application is also applicable to adjustment of the suspension actuator(s) 308 during traversal of road curvature.

504 illustrates the natural motion of the floor 508 of the trailer 204 in response to the curvature to the left illustrated. 512 illustrates the lowering of the left side of trailer 204 and/or the raising of the right side of the trailer to level the floor 508 of the trailer 204 for the leftward curvature. The trailer floor 508 is parallel to the plane of the road 514 under the vehicle in this example. The trailer floor 508 being parallel to the plane of the road 514 improves vehicle dynamics. 516 illustrates the increased lowering of the left side of trailer 204 and/or the increased raising of the right side of the trailer 204 for anti-roll control. This leans the floor 508 of the trailer 204 toward the leftward curvature (left side of the trailer 204 vertically lower than the right side of the trailer 204).

In various implementations, when the road in front of the trailer 204 is approximately straight (e.g., curvature less than a predetermined value, the adjustment module 416 may lower the suspension actuator(s) 308 to lower the floor 508 of the trailer 204. This decreases aerodynamic drag of the trailer 204 and may increase a range of the vehicle 200 towing the trailer 204. This is illustrated by 520 of FIG. 5. The adjustment module 416 may lower the suspension actuator(s) 308 for example to a predetermined ride height.

Referring back to FIG. 4, the adjustment module 416 may additionally or alternatively adjust the suspension actuator(s) 308 under one or more other circumstances. As discussed above, the suspension actuator(s) 308 may be adjusted before the trailer 204 encounters a turn based on the images 436. Additionally or alternatively, the adjustment module 416 may adjust the suspension actuator(s) 308 based on the SWA 142. The SWA 142 may indicate present turning of the vehicle 200 and future turning of the trailer 204. For example, the adjustment module 416 may adjust the suspension actuator(s) 308 and lower the right side of the trailer 204 and/or raise the left side of the trailer 204 when the SWA 142 is to the right (indicative of turning to the right). The adjustment module 416 may adjust the suspension actuator(s) 308 and raise the right side of the trailer 204 and/or lower the left side of the trailer 204 when the SWA 142 is to the left (indicative of turning to the left). The lowering and/or raising may increase as the SWA 142 moves away from a 0 angle corresponding to the forward direction 208 and vice versa. The adjustment module 416 may determine the adjustment(s), for example, using one of a lookup table and an equation that SWAs to adjustment(s).

Additionally or alternatively, the adjustment module 416 may adjust the suspension actuator(s) 308 based on the trailer loads 440 measured by the load sensors 336. For example, when the trailer load 440 on the right side of the trailer 204 is greater than the trailer load 440 on the left side of the trailer 440, the adjustment module 416 may adjust the suspension actuator(s) 308 to lower the right side of the trailer 204. The opposite may be true for the load on the left side being greater than the load on the right side of the trailer 204. The adjustment module 416 may determine the adjustment(s), for example, using one of a lookup table and an equation that relates trailer loads to adjustment(s).

Additionally or alternatively, the adjustment module 416 may adjust the suspension actuator(s) 308 based on the ride heights 444 measured by the ride height sensors 340. For example, when the ride height 444 on the right side of the trailer 204 is greater than the ride height 444 on the left side of the trailer 440, the adjustment module 416 may adjust the suspension actuator(s) 308 to lower the right side of the trailer 204. The opposite may be true for the ride height on the left side being greater than the ride height on the right side of the trailer 204. The adjustment module 416 may determine the adjustment(s), for example, using one of a lookup table and an equation that relates ride heights to adjustment(s).

Additionally or alternatively, the adjustment module 416 may raise the suspension actuator(s) 308 and raise the floor 508 of the trailer 204 when a rise module 448 indicates 452 an upcoming rise (e.g., crest, bump, etc.) in the road. The rise module 448 may determine whether a rise is in the road based on the images 436 from the camera. This prepares the trailer 204 to clear the rise. The adjustment module 416 may determine the adjustment(s), for example, using one of a lookup table and an equation that relates height of rises to adjustment(s).

Additionally or alternatively, the adjustment module 416 may lower the suspension actuator(s) 308 and lower the floor 508 of the trailer 204 when an overhead obstacle (e.g., a bridge, garage, etc.) is detected in front of the trailer 204. This may prepare the trailer 204 to clear the overhead obstacle. Overhead obstacles may be detected by an overhead module 456 based on images 436 from the camera. The adjustment module 416 may determine the adjustment(s), for example, using one of a lookup table and an equation that relates curvatures to adjustment(s).

Additionally or alternatively, the adjustment module 416 may adjust the suspension actuator(s) 308 based on the wind direction and/or speed 460 measured by the wind gauge 320. For example, when the wind is contacting the left side of the trailer, the adjustment module 416 may adjust the suspension actuator(s) 308 and raise the right side of the trailer 204. The adjustment module 416 may set the rise based on the wind speed, such as increase the rise as the wind speed increases and vice versa. The opposite may be true for the situation where the wind is contacting the left side of the trailer 204, where the adjustment module 416 may adjust the suspension actuator(s) 308 and raise the left side of the trailer 204. This increases vehicle and trailer stability and counteracts the force of the wind on the trailer. The adjustment module 416 may determine the adjustment(s), for example, using one of a lookup table and an equation that relates wind directions and speeds to adjustment(s).

Additionally or alternatively, the adjustment module 416 may adjust the suspension actuator(s) 308 based on the acceleration (e.g., lateral) 464 measured by the IMU 324. For example, when the acceleration 464 is rightward, the adjustment module 416 may adjust the suspension actuator(s) 308 and raise the right side of the trailer 204. Additionally or alternatively, the adjustment module 416 may adjust the suspension actuator(s) 308 and lower the left side of the trailer 204. The adjustment module 416 may set the rise/lowering based on the magnitude of the acceleration, such as increase magnitude of the rise/lowering the magnitude of the acceleration increases and vice versa. The opposite may be true for the situation where the acceleration 464 is leftward, where the adjustment module 416 may adjust the suspension actuator(s) 308 and raise the left side of the trailer 204. The adjustment module 416 may additionally or alternatively adjust the suspension actuator(s) 308 and lower the left side of the trailer 204. This increases vehicle and trailer stability and counteracts the lateral acceleration of the trailer. The adjustment module 416 may determine the adjustment(s), for example, using one of a lookup table and an equation that relates accelerations to adjustment(s).

Additionally or alternatively, the adjustment module 416 may adjust the suspension actuator(s) 308 based on the yaw 468 measured by the yaw sensor 328. For example, when the yaw 468 is clockwise, the adjustment module 416 may adjust the suspension actuator(s) 308 and raise the right side of the trailer 204. Additionally or alternatively, the adjustment module 416 may adjust the suspension actuator(s) 308 and lower the left side of the trailer 204. The adjustment module 416 may set the rise/lowering based on the magnitude of the yaw 468, such as increase magnitude of the rise/lowering the magnitude of the acceleration increases and vice versa. The opposite may be true for the situation where the yaw 468 is counterclockwise, where the adjustment module 416 may adjust the suspension actuator(s) 308 and raise the left side of the trailer 204. The adjustment module 416 may additionally or alternatively adjust the suspension actuator(s) 308 and lower the left side of the trailer 204. This increases vehicle and trailer stability and counteracts the yaw 468 of the trailer 204. The adjustment module 416 may determine the adjustment(s), for example, using one of a lookup table and an equation that relates yaws to adjustment(s).

Figure 6:
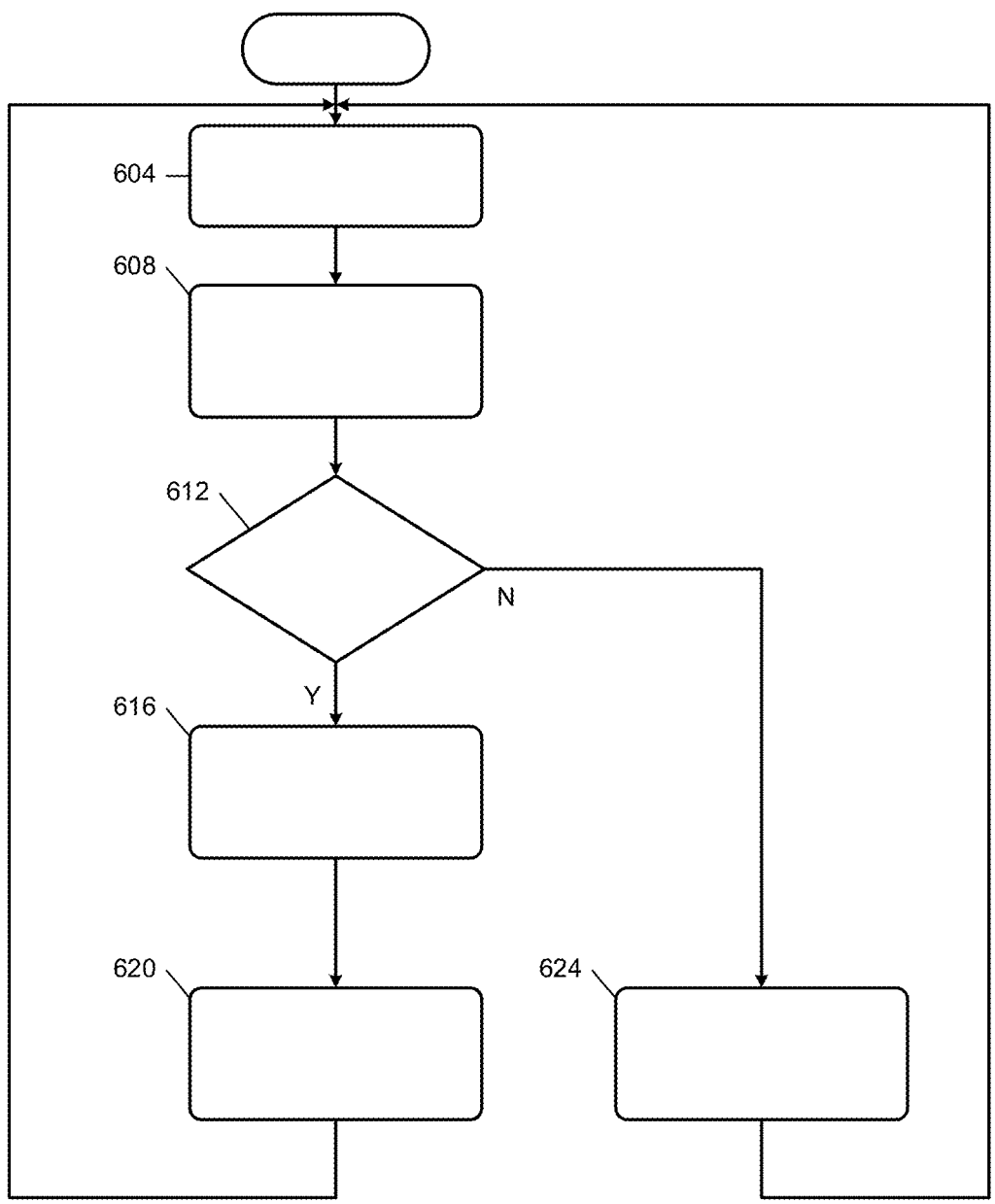
FIG. 6 is a flowchart depicting an example method of controlling the adjustable suspension actuator(s).

FIG. 6 is a flowchart depicting an example method of controlling the adjustable suspension actuator(s) 308. Control begins with 604 where the suspension control module 312 receives inputs, such as the image 436, the SWA 142, the trailer loads 440, the wind direction and/or speed 460, the acceleration 464, the ride heights 444, and/or the yaw 468.

At 608, the actuator control module 404 may determine default actuator parameter(s) for the suspension actuator(s) 308, such as based on the ride heights 444 and/or the trailer loads 440. The actuator control module 404 may determine the default parameter(s), for example, using an equation or a lookup table that relates ride heights and/or trailer loads to actuator parameter(s).

At 612, the adjustment module 416 determines whether one or more adjustment conditions for adjusting the suspension actuator(s) 308 are present, such as described above. For example, the adjustment conditions may include a curve in the road in front of the trailer 204, a rise in the road in front of the trailer 204, the road in front of the trailer 204 being approximately straight forward, an overhead obstacle in front of the trailer 204, the trailer loads 440 being unequal, wind on the trailer, acceleration (e.g., latera) of the trailer 204, or yaw of the trailer.

If 612 is true, control continues with 616. If 612 is false, the actuator control module 404 actuates the suspension actuator(s) based on the default parameters at 624, and control returns to 604. At 616, the adjustment module 416 determines adjustments for the suspension actuator(s) 308 as discussed above. At 620, the actuator control module 404 actuates the suspension actuator(s) based on the adjustments, and control returns to 604.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A trailer, comprising:
    one or more adjustable suspension actuators;
    an actuator control module configured to actuate the one or more adjustable suspension actuators;
    a camera configured to capture images of a road in front of the trailer;
    a curvature module configured to determine a curvature of the road in front of the trailer based on an image from the camera;
    an adjustment module configured to selectively adjust the one or more adjustable suspension actuators while the trailer is moving based on the curvature of the road in front of the trailer including:
    adjusting the one or more adjustable suspension actuators and lowering a right side of the trailer when the road in front of the trailer curves rightward;
    adjusting the one or more adjustable suspension actuators and increasingly lowering the right side of the trailer as a radius of the curvature of the road in front of the trailer rightward decreases; and
    adjusting the one or more adjustable suspension actuators and decreasingly lowering the right side of the trailer as the radius of the curvature of the road in front of the trailer rightward increases.

2. The trailer of claim 1 wherein the adjustment module is further configured to adjust the one or more adjustable suspension actuators and raise a left side of the trailer when the road in front of the trailer curves rightward.

3. The trailer of claim 1 wherein the adjustment module is further configured to adjust the one or more adjustable suspension actuators and lower a left side of the trailer when the road in front of the trailer curves leftward.

4. The trailer of claim 1 wherein the adjustment module is further configured to actuate the one or more adjustable suspension actuators and lower both left and right sides of the trailer when the road in front of the trailer has approximately zero curvature.

5. The trailer of claim 1 wherein the adjustment module is configured to actuate the one or more adjustable suspension actuators further based on a steering wheel angle (SWA) of a vehicle towing the trailer.

6. The trailer of claim 5 wherein the adjustment module is configured to adjust the one or more adjustable suspension actuators and lower a right side of the trailer when SWA is to a right of a forward direction of travel of the vehicle.

7. The trailer of claim 6 wherein the adjustment module is configured to increasingly lower the right side of the trailer as SWA moves rightward and away from the forward direction of travel of the vehicle.

8. The trailer of claim 1 wherein the adjustment module is configured to actuate the one or more adjustable suspension actuators further based on detection of an overhead obstacle in front of the trailer in an image from the camera.

9. The trailer of claim 8 wherein the adjustment module is configured to lower both left and right sides of the trailer when the overhead obstacle is present in front of the trailer.

10. The trailer of claim 1 wherein the adjustment module is configured to actuate the one or more adjustable suspension actuators further based on trailer loads on left and right sides of the trailer measured using trailer load sensors.

11. The trailer of claim 1 wherein the adjustment module is configured to actuate the one or more adjustable suspension actuators further based on right heights of left and right sides of the trailer measured using trailer load sensors of the trailer.

12. The trailer of claim 1 wherein the adjustment module is configured to actuate the one or more adjustable suspension actuators further based on a yaw of the trailer measured using a yaw sensor of the trailer.

13. The trailer of claim 1 wherein the adjustment module is configured to actuate the one or more adjustable suspension actuators further based on a lateral acceleration of the trailer.

14. The trailer of claim 13 wherein the adjustment module is configured to adjust the one or more adjustable suspension actuators and lower a right side of the trailer when the lateral acceleration of the trailer is leftward.

15. The trailer of claim 14 wherein the adjustment module is configured to adjust the one or more adjustable suspension actuators and raise a left side of the trailer when the lateral acceleration of the trailer is leftward.

16. The trailer of claim 1 wherein the one or more adjustable suspension actuators include at least one of (a) a leaf spring and an actuator, (b) air bag suspension actuators, (c) hydraulic suspension actuators, and (c) magnetorheological suspension actuators.

17. A method for a trailer, comprising:
    selectively actuating one or more adjustable suspension actuators of the trailer;
    by a camera, capturing images of a road in front of the trailer;
    determining a curvature of the road in front of the trailer based on an image from the camera; and
    selectively adjusting the one or more adjustable suspension actuators while the trailer is moving based on the curvature of the road in front of the trailer including:
    adjusting the one or more adjustable suspension actuators and lowering a right side of the trailer when the road in front of the trailer curves rightward;
    adjusting the one or more adjustable suspension actuators and increasingly lowering the right side of the trailer as a radius of the curvature of the road in front of the trailer rightward decreases; and adjusting the one or more adjustable suspension actuators and decreasingly lowering the right side of the trailer as the radius of the curvature of the road in front of the trailer rightward increases.

\* \* \* \* \*